United States Patent
Yu et al.

(10) Patent No.: US 10,311,894 B2
(45) Date of Patent: Jun. 4, 2019

(54) SYSTEM AND METHOD FOR LOCATING MOBILE NOISE SOURCE

(71) Applicant: OTOCON INC., Taoyuan (TW)

(72) Inventors: Jen-Fang Yu, Taoyuan (TW);
Tung-Hung Sun, Taoyuan (TW);
Yen-Sheng Chen, Taoyuan (TW)

(73) Assignee: OTOCON INC., Taoyuan (TW)

( * ) Notice: Subject to any disclaimer, the term of this patent is extended or adjusted under 35 U.S.C. 154(b) by 0 days.

(21) Appl. No.: 15/138,641

(22) Filed: Apr. 26, 2016

(65) Prior Publication Data

US 2016/0314804 A1  Oct. 27, 2016

(30) Foreign Application Priority Data

Apr. 27, 2015  (TW) ............... 104113446 A

(51) Int. Cl.

| G06K 9/00 | (2006.01) |
|---|---|
| G10L 25/51 | (2013.01) |
| H04N 7/18 | (2006.01) |
| G06F 16/58 | (2019.01) |
| G06F 16/683 | (2019.01) |
| G10L 25/18 | (2013.01) |
| G10L 25/21 | (2013.01) |

(52) U.S. Cl.
CPC ............ G10L 25/51 (2013.01); G06F 16/58 (2019.01); G06F 16/683 (2019.01); G06K 9/00785 (2013.01); H04N 7/188 (2013.01); G10L 25/18 (2013.01); G10L 25/21 (2013.01)

(58) Field of Classification Search
CPC ......... G10L 25/51; G10L 25/18; G10L 25/21; G06K 9/00785; G06F 17/30265; G06F 17/30743; G06F 16/683; G06F 16/58; H04N 7/188

USPC .............. 381/56, 86, 122; 386/224; 725/12; 348/239; 340/937

See application file for complete search history.

(56) References Cited

U.S. PATENT DOCUMENTS

| 4,575,829 | A | * | 3/1986 | Duhe | .................... | G01H 3/125 |
|---|---|---|---|---|---|---|
| | | | | | | 367/117 |
| 6,970,102 | B2 | | 11/2005 | Ciolli | | |
| 6,997,057 | B2 | * | 2/2006 | Noel | ...................... | B60R 11/02 |
| | | | | | | 181/141 |
| 2006/0253282 | A1 | | 11/2006 | Schmidt | | |
| 2006/0269104 | A1 | * | 11/2006 | Ciolli | .................... | G08G 1/052 |
| | | | | | | 382/104 |

(Continued)

FOREIGN PATENT DOCUMENTS

TW         I307493         3/2009

*Primary Examiner* — Vivian C Chin
*Assistant Examiner* — Con P Tran
(74) *Attorney, Agent, or Firm* — WPAT, PC

(57) ABSTRACT

In a system for locating a mobile noise source, a sound sensing device catches a sound wave of a mobile noise source within a specified area for a specified time period, and outputs a characteristic information corresponding to the sound wave. An audio comparing device in communication with the sound sensing device compares the characteristic information with a set of standard data, and outputs an activating signal in response to a specific compared result. An image pickup device in communication with the audio comparing device performs an image pickup operation to catch an image of the mobile noise source in response to the activating signal.

8 Claims, 3 Drawing Sheets

(56) References Cited

U.S. PATENT DOCUMENTS

| | | | | |
|---|---|---|---|---|
| 2009/0151837 A1* | 6/2009 | Uhlenbruch | .......... | B60C 19/002 152/450 |
| 2009/0285409 A1* | 11/2009 | Yoshizawa | ............ | G01S 3/8083 381/92 |
| 2012/0323531 A1* | 12/2012 | Pascu | .................. | G01M 13/028 702/184 |

* cited by examiner

SYSTEM AND METHOD FOR LOCATING MOBILE NOISE SOURCE

FIELD OF THE INVENTION

The present invention relates to system and method for locating a mobile noise source, and more particularly to system and method for locating a noisy vehicle or an illegally modified vehicle.

BACKGROUND OF THE INVENTION

In consideration of environmental protection issues, noise pollution, just like air pollution, is another problem to face seriously. As known, running vehicles are one of the major noisy sources in daily lives. It is, however, hard to locate a vehicle beyond a statutory noise standard while providing a proof for fining.

SUMMARY OF THE INVENTION

The present invention provides system and method for locating a mobile noise source to solve the problem by automatically catching an image of the mobile noise source according to a compared result of characteristic information.

The present invention provides a system for locating a mobile noise source, which comprises: a sound sensing device catching a sound wave of a mobile noise source within a specified area for a specified time period, and outputting a characteristic information corresponding to the sound wave; an audio comparing device in communication with the sound sensing device, comparing the characteristic information with a set of standard data, and outputting an activating signal in response to a specific compared result; and an image pickup device in communication with the audio comparing device, performing an image pickup operation to catch an image of the mobile noise source in response to the activating signal.

In an embodiment, the system further comprises a video comparing device in communication with the audio comparing device, comparing an image data of the mobile noise source with a default image data corresponding to the mobile noise source, and issuing a confirming signal in response to a specific compared result.

The present invention further provides a method for locating a mobile noise source, which comprises: transforming a sound wave received in a specified area for a specified time period into a characteristic information; automatically issuing an activating signal when a compared result of the characteristic information and a default audio data shows a status to be noted; and automatically picking up an image of the mobile noise source and generating and storing an image data of the mobile noise source in response to the activating signal.

In an embodiment, the method further comprises automatically issuing a confirmation signal when a compared result of the image data with a default video data confirms the status to be noted.

BRIEF DESCRIPTION OF THE DRAWINGS

The invention will become more readily apparent to those ordinarily skilled in the art after reviewing the following detailed description and accompanying drawings.

DETAILED DESCRIPTION OF PREFERRED EMBODIMENTS

The invention hereinafter will be described in greater detail with preferred embodiments of the invention and accompanying illustrations. Nevertheless, it should be recognized that the preferred embodiments of the invention are not provided to limit the invention but to illustrate it. The present invention can be practiced not only in the preferred embodiments herein mentioned, but also in a wide range of other embodiments besides those explicitly described. Furthermore, the scope of the present invention is expressly not limited to any particular embodiments except what is specified in the appended Claims.

Figure 1:
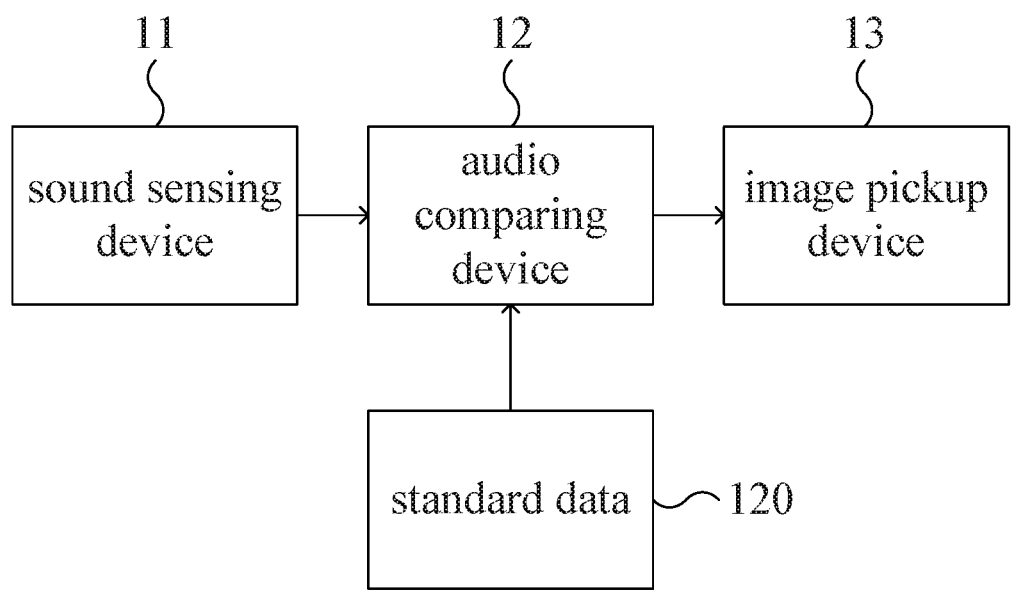
FIG. 1 is a circuit block diagram schematically illustrating a system for locating a mobile noise source according to an embodiment of the present invention.

Please refer to FIG. 1, which schematically illustrates a system for locating a mobile noise source according to an embodiment of the present invention. The system includes a sound sensing device 11, an audio comparing device 12 and an image pickup device 13. The sound sensor 11 catches a sound wave of a mobile noise source within a specified area during a specified time period, and outputs a characteristic information corresponding to the sound wave. The audio comparing device 12 in communication with the sound sensing device 11 compares the characteristic information with a set of standard data 120. If it is determined that the characteristic information complies with the set of standard data 120, the audio comparing device 12 outputs an activating signal to trigger an image pickup operation of the image pickup device 13 to catch an image of the mobile noise source. Consequently, an entry of image data is generated and stored.

For example, the mobile noise source may be a vehicle such as an automobile, a motorcycle, an aircraft, a boat, or any other running machine that makes noises. The sound sensing device 11 may be a single microphone or a set of microphones, which may be allocated as a matrix. The sound sensing device 11 is capable of focusing and sensing sound waves generated by vehicles in a monitored area, e.g. a specific section of a road, for a monitored period of time, e.g. 5~10 seconds. The characteristic information generated corresponding to a sound wave may be a maximum of the sound wave amplitude. For example, a running vehicle with a modified exhaust or a modified engine might make noises bigger than a standard stipulated for such vehicles and thus violate rules. With the system according to the present invention, the sound sensing device 11 can catch a sound wave of the vehicle to detect the maximal amplitude of the sound wave. Then the audio comparing device 12 compares the maximal amplitude of the sound wave with the set of standard data 120 to determine whether the maximal amplitude of the sound wave exceeds a legally accepted level. If positive, the audio comparing device 12 outputs an activating signal to the image pickup device 13, thereby triggering the image pickup device 13 to pick up the image of the vehicle, and generate and store an entry of image data of the vehicle. The image pickup device 13, for example, may be a digital still camera, a video camera or a combination thereof, and the image data may be a still image, a dynamic film or a combination thereof.

The characteristic information, in addition to being a maximum of a sound wave amplitude, may alternatively be a spectrogram data or a combination of a maximal amplitude of the sound wave and the spectrogram data. In either case, the set of standard data include a spectrogram database for comparison. The spectrogram database contains spectrogram data of all the mobile noise sources to be monitored. For example, default spectrogram data of all types and brands of vehicles possibly on the road are stored in or provided for the audio comparing device 12, e.g. via a network, to be compared with the real-time spectrogram data obtained by the sound sensing device 11. Since the spectrogram data of a modified vehicle would not match the default one, such a vehicle can be located by the present system in a manner as described above. Likewise, an image data of the vehicle can be retained for reporting by the image pickup device 13. Alternatively, a noise level may be detected as an additional parameter for triggering the image pickup device 13. For reporting, the image data need to include identification data of the vehicle, e.g. the license plate number of the vehicle.

Figure 2:
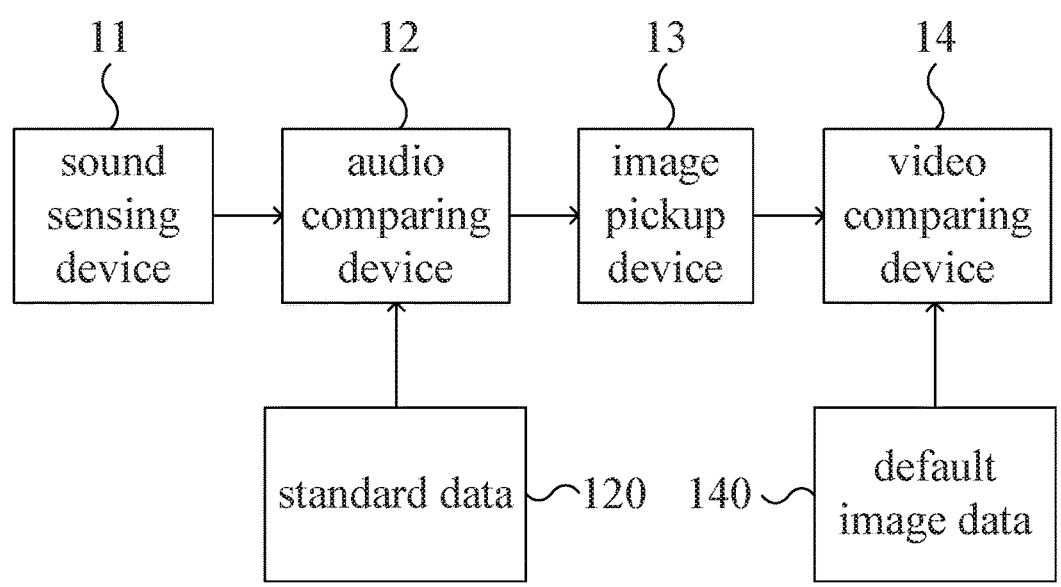
FIG. 2 is a circuit block diagram schematically illustrating a system for locating a mobile noise source according to another embodiment of the present invention.

In another embodiment of the present invention, as illustrated in the block diagram of FIG. 2, the system for locating a mobile noise source further includes a video comparing device 14 in communication with the audio comparing device 12. The video comparing device 14 are pre-stored therein or can access entries of image data 140, e.g. via a network, for double check. For example, when a vehicle is determined to be a modified vehicle based on the spectrogram data, an image data of the vehicle is transmitted from the image pickup device 13 to the video comparing device 14 to be compared with the default image data 140. The default image data 140 include entire or partial appearances of all the types and brands of vehicles to be monitored. Therefore, the comparison would show whether the appearance of the specified vehicle changes. Once a mismatching result is realized, a confirming signal is issued, and the report may include the fact of, for example, modification of an exhaust.

Figure 3:
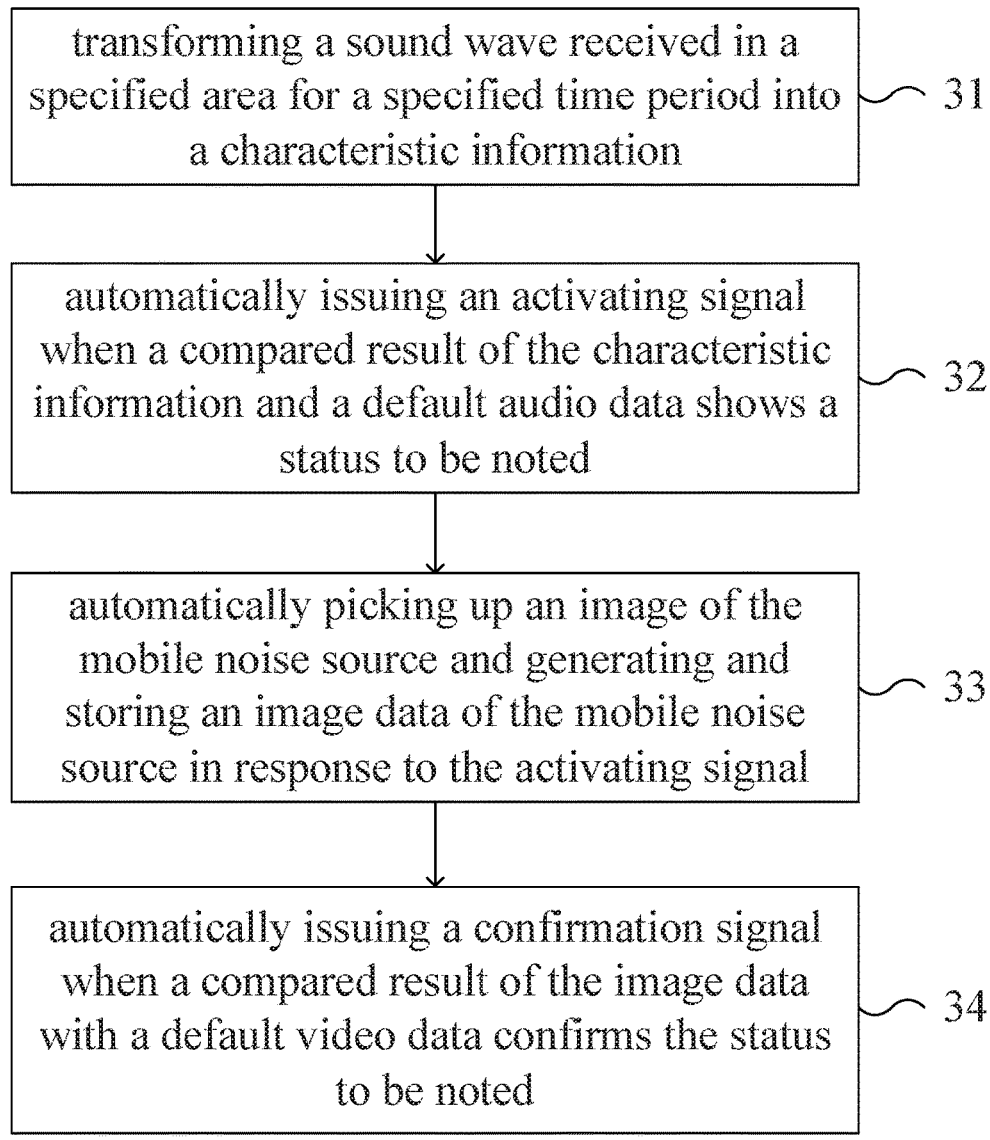
FIG. 3 is a flowchart schematically illustrating a method for locating a mobile noise source according to an embodiment of the present invention.

The flowchart of FIG. 3 schematically illustrates a method for locating a mobile noise source according to an embodiment of the present invention. The method is adapted to be executed by the above-described system. The method includes steps of: transforming a sound wave received in a specified area for a specified time period into a characteristic information (Step 31); automatically issuing an activating signal when a compared result of the characteristic information and a default audio data shows a status to be noted (Step 32); automatically picking up an image of the mobile noise source and generating and storing an image data of the mobile noise source in response to the activating signal (Step 33); and automatically issuing a confirmation signal when a compared result of the image data with a default video data confirms the status to be noted (Step 34). It is to be noted that Step 34 is optional for executing for double check. Of course, Step 34 may also be an essential step when the video comparison is made for a purpose in addition to or other than double check.

Likewise, the mobile noise source, for example, may be a vehicle such as an automobile, a motorcycle, an aircraft, a boat, or any other running machine that makes noises. The transformation of sound waves may be executed by a sound sensing device, e.g. a single microphone or a set of microphones, which may be allocated as a matrix. The sound sensing device is capable of focusing and sensing sound waves generated by vehicles in a monitored area, e.g. a specific section of a road, for a monitored period of time, e.g. 5~10 seconds. The characteristic information generated corresponding to a sound wave may be a maximum of the sound wave amplitude. For example, a running vehicle with a modified exhaust or a modified engine might make noises bigger than a standard stipulated for such vehicles and thus violate rules. With the system according to the present invention, the sound sensing device can catch a sound wave of the vehicle to detect the maximal amplitude of the sound wave. The audio comparing step may be executed by, for example, an audio comparing device, which compares the maximal amplitude of the sound wave with a set of standard data to determine whether the maximal amplitude of the sound wave is under a legally accepted level. If it exceeds the level, the audio comparing device outputs the activating signal. An image pickup device, when receiving the activating signal, picks up the image of the vehicle, and generates and stores an entry of image data of the vehicle. The image pickup device, for example, may be a digital still camera, a video camera or a combination thereof, and the image data may be a still image, a dynamic film or a combination thereof. The video comparing step may be executed by, for example, a video comparing device in communication with the audio comparing device. The video comparing device are pre-stored therein or can access entries of image data, e.g. via a network, for double check. For example, when a vehicle is determined to be a modified vehicle based on the spectrogram data, an image data of the vehicle is transmitted from the image pickup device to the video comparing device to be compared with the default image data. The default image data include entire or partial appearances of all the types and brands of vehicles to be monitored. Therefore, the comparison would show whether the appearance of the specified vehicle changes. Once a mismatching result is realized, a confirming signal is issued, and the report may include the fact of, for example, modification of an exhaust.

The characteristic information, in addition to being a maximum of a sound wave amplitude, may alternatively be a spectrogram data or a combination of a maximal amplitude of the sound wave and the spectrogram data. In either case, the set of standard data include a spectrogram database for comparison. The spectrogram database contains spectrogram data of all the mobile noise sources to be monitored. For example, default spectrogram data of all types and brands of vehicles possibly on the road are stored in or provided for the audio comparing device, e.g. via a network, to be compared with the real-time spectrogram data obtained by the sound sensing device. Since the spectrogram data of a modified vehicle would not match the default one, such a vehicle can be readily located according to the present method in a manner as described above. Likewise, an image data of the vehicle can be retained for reporting by the image pickup device. Alternatively, a noise level may be detected as an additional parameter for triggering the image pickup device. For reporting, the image data need to include identification data of the vehicle, e.g. the license plate number of the vehicle.

As described above, by way of the system and method according to the present invention, a target mobile noise source can be readily located and recorded. While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A system for locating a mobile noise source, comprising:
   a sound sensing device catching a sound wave of a specified mobile noise source within a specified area for a specified time period, and outputting a characteristic information corresponding to the sound wave, wherein the characteristic information includes a spectrogram data of the sound wave;
   an audio comparing device in communication with the sound sensing device, comparing the spectrogram data of the sound wave with spectrogram data of a plurality of mobile noise sources contained in a database, and outputting an activating signal if the spectrogram data does not match with any of the spectrogram data in the database; and
   an image pickup device in communication with the audio comparing device, performing an image pickup operation to catch an image of the specified mobile noise source in response to the activating signal.

2. The system according to claim 1, wherein the characteristic information further includes a maximum of an amplitude of the sound wave, and the activating signal is automatically issued when the maximal amplitude of the sound wave exceeds a legally accepted level.

3. The system according to claim 1, wherein the image pickup device is a digital still camera, a video camera or a combination thereof.

4. The system according to claim 1, further comprising a video comparing device in communication with the audio comparing device, comparing an image data of the specified mobile noise source with a default image data for the same type of the specified mobile noise source, and issuing a confirming signal if the compared result indicates that the caught image data mismatches with the default image data.

5. A method for locating a mobile noise source, comprising:
   transforming a sound wave received from a specified mobile noise source in a specified area for a specified time period into a characteristic information, wherein the characteristic information includes a spectrogram data of the sound wave;
   automatically issuing an activating signal when a compared result of the spectrogram data of the sound wave with spectrogram data of a plurality of mobile noise sources contained in a database, indicates a mismatching status; and
   automatically picking up an image of the specified mobile noise source and generating and storing an image data of the specified mobile noise source in response to the activating signal.

6. The method according to claim 5, further comprising automatically issuing a confirmation signal when a compared result of the image data with a default video data corresponding to the type of the specified mobile noise source confirms the mismatching status.

7. The method according to claim 5, wherein the characteristic information further includes a maximum of an amplitude of the sound wave, and the activating signal is automatically issued when the maximal amplitude of the sound wave exceeds a legally accepted level.

8. The method according to claim 5, wherein the image data is a still image, a video film or a combination thereof.

* * * * *